United States Patent [19]

Corsberg

[11] Patent Number: 4,749,985

[45] Date of Patent: Jun. 7, 1988

[54] FUNTIONAL RELATIONSHIP-BASED ALARM PROCESSING

[75] Inventor: Daniel R. Corsberg, Idaho Falls, Id.

[73] Assignee: United States of America as represented by the United States Department of Energy, Washington, D.C.

[21] Appl. No.: 37,897

[22] Filed: Apr. 13, 1987

[51] Int. Cl.$^4$ .............................................. G08B 23/00
[52] U.S. Cl. .................................... 340/517; 340/500; 340/506; 340/519; 340/522; 340/523; 340/525; 364/431.01
[58] Field of Search ................ 340/517, 500, 501, 506, 340/519, 520, 521, 522, 510, 511, 523, 524, 525; 364/138, 141, 147, 431.01, 550

[56] References Cited

U.S. PATENT DOCUMENTS

4,015,237  3/1977  Takatani et al. ..................... 340/519
4,401,971  8/1983  Saito et al. .......................... 340/519

OTHER PUBLICATIONS

V. Exparza, Jr. et al., "Safety Monitoring in Process and Control," Apr., 1984, pp. 1–6, Mexican–American Eng. Society Eighth National Engineering Symposium.
D. Corsberg et al., "A Functional Relationship Based Alarm Processing System for Nuclear Power", Sep. 1986, Intenational ANS/ENS meeting on Operability of Nuclear Power System in Normal and Adverse Environments.
Corsberg et al., "An Object–Oriented Alarm–Filtering System", Apr. 1986, 6th Power Plant Dynamics, Control and Testing Symposium.
DMA (Diagnosis of Multiple Alarms), disclosed in an article by M. M. Danchak, entitled "Alarms Within Advanced Display Streams: Alternative and Performance Measures", published in NUREG/CR-2276, EGG–2202, Sep. 1982.
Star, disclosed in an article by L. Felkel, entitled "The Star Concept, Systems to Assist the Operator During Abnormal Events", published in *Atomkernenergie, Kertechnik*, vol. 45, No. 4, 1984, pp. 252–262.
DASS (Disturbance Analysis and Surveillance Systems), disclosed in an article by A. B. Long, R. M. Kanazave et al., entitled "Summary and Evaluation of Scoping and Feasibility Studies for Disturbance Analysis and Surveillance Systems (DASS)", published in Topical Report EPRI NP—1964, Dec. 1980.

*Primary Examiner*—Donnie L. Crosland
*Attorney, Agent, or Firm*—Hugh W. Glenn; Robert J. Fisher; Judson R. Hightower

[57] ABSTRACT

A functional relationship-based alarm processing system and method analyzes each alarm as it is activated and determines its relative importance with other currently activated alarms and signals in accordance with the relationships that the newly activated alarm has with other currently activated alarms. Once the initial level of importance of the alarm has been determined, that alarm is again evaluated if another related alarm is activated. Thus, each alarm's importance is continuously oupdated as the state of the process changes during a scenario. Four hierarchical relationships are defined by this alarm filtering methodology: (1) level precursor (usually occurs when there are two alarm settings on the same parameter); (2) direct precursor (based on caussal factors between two alarms); (3) required action (system response or action) expected within a specified time following activation of an alarm or combination of alarms and process signals); and (4) blocking condition (alarms that are normally expected and are not considered important). The alarm processing system and method is sensitive to the dynamic nature of the process being monitored and is capable of changing the relative importance of each alarm as necessary.

25 Claims, 6 Drawing Sheets

FIGURE 10B

| VESSEL DIFFERENTIAL PRESSURE HIGH-HIGH | VESSEL DIFFERENTIAL PRESSURE HIGH-LOW | VESSEL DIFFERENTIAL PRESSURE LOW-LOW | EXPERIMENTAL LOOP 1A MALFUNCTION | EXPERIMENTAL LOOP 1C-W MALFUNCTION |
| --- | --- | --- | --- | --- |
| INLET PRESSURE HIGH-HIGH | INLET PRESSURE HIGH-LOW | INLET PRESSURE LOW-LOW | EXPERIMENTAL LOOP 2A MALFUNCTION | EXPERIMENTAL LOOP 2B MALFUNCTION |
| OUTLET PRESSURE HIGH | EMERGENCY PUMP RECIRC. FLOW LOW | OUTLET PRESSURE LOW | EXPERIMENTAL LOOP 2C-S MALFUNCTION | EXPERIMENTAL LOOP 2D MALFUNCTION |
| VESSEL LEVEL LOW | VESSEL LEVEL LOW-LOW | MANUAL SCRAM | SEISMIC HIGH | RCCC POWER SUPPLY OVER/UNDER VOLTAGE |
| FIS VESSEL LOWER INJECTION | FIS VESSEL LEVEL LOW | FIS VESSEL UPPER INJECTION | 32 V DC DISTRIBUTION LOW VOLTAGE | 32 V DC DISTRIBUTION BREAKER TRIPPED |
| CHANNEL A | CHANNEL B | CHANNEL C | CHANNEL D | ESF 1 RELAYS LOSS OF VOLTAGE |
| DIVISION 1 LOGIC TRIPPED | DIVISION 2 LOGIC TRIPPED | DIVISION 3 LOGIC TRIPPED | DIVISION 4 LOGIC TRIPPED | DEPRESSURIZED MODE SELECTED |
| ESF 1 PRIMARY PUMP TRIP | ESF 4 PRIMARY PUMP TRIP | ESF 1 PRESSURIZING PUMP TRIP | ESF 4 PRESSURIZING PUMP TRIP | SCRAM |

Plant Status Printer
26

| | | | | |
|---|---|---|---|---|
| EXPERIMENTAL LOOP 1D MALFUNCTION | | DIFFERENTIAL TEMPERATURE QUAD 1 HIGH | DIFFERENTIAL TEMPERATURE QUAD 1 HIGH-HIGH | DIFFERENTIAL TEMPERATURE QUAD 2 HIGH | DIFFERENTIAL TEMPERATURE QUAD 2 HIGH-HIGH |
| EXPERIMENTAL LOOP 2C-E MALFUNCTION | | DIFFERENTIAL TEMPERATURE QUAD 3 HIGH | DIFFERENTIAL TEMPERATURE QUAD 3 HIGH-HIGH | DIFFERENTIAL TEMPERATURE QUAD 4 HIGH | DIFFERENTIAL TEMPERATURE QUAD 4 HIGH-HIGH |
| EXPERIMENTAL LOOP 2E MALFUNCTION | | OUTLET TEMPERATURE HIGH | OUTLET TEMPERATURE HIGH-HIGH | INLET TEMPERATURE HIGH | INLET TEMPERATURE HIGH-HIGH |
| PALM MALFUNCTION | | NEUTRON LEVEL HIGH | NEUTRON LEVEL HIGH-HIGH | WIDE RANGE NEUTRON HIGH | WIDE RANGE NEUTRON HIGH-HIGH |
| 32 V CHARGER TROUBLE | | FISSION BREAK HIGH ACTIVITY | FISSION BREAK HIGH-HIGH ACTIVITY | STACK DISCHARGE RADIATION HIGH | STACK DISCHARGE RADIATION HIGH-HIGH |
| ESF 4 RELAYS LOSS OF VOLTAGE | | SAIS DETECTED PPS TROUBLE | SAIS TROUBLE | SURVEILLANCE FUNCTION DISABLED | BATTERY ROOM VENTILATION FAILURE |
| SHUTDOWN MODE SELECTED | | ROD STRAP POWER ON | ROD STRAPPED | ROD STRAP POWER TROUBLE | PPS CABINET 1 HIGH TEMPERATURE |

Plant Alarm Messages
28

FIG. 10B

FUNTIONAL RELATIONSHIP-BASED ALARM PROCESSING

CONTRACTUAL ORIGIN OF THE INVENTION

The United States Government has rights in this invention under Contract No. DE-AC07-76ID01570 between EG&G Idaho, Inc. and the U.S. Department of Energy.

BACKGROUND OF THE INVENTION

This invention relates generally to systems and methods for controlling a process and is particularly directed to the analysis of alarms in a process based upon the relationships that a newly activated alarm has with other currently activated alarms.

There are generally two types of methodologies in the handling of alarms in process control. One approach makes use of a predetermined, static ranking of the alarms. Thus, all of the alarms in the process are considered as a group and ranked according to their relative importance. These rankings are incorporated within an alarm system such that, no matter what the state of the process, an alarm will always be emphasized according to this predetermined set of rankings. While this methodology can be helpful, it is incapable of adjusting the importance of alarms based on the dynamics of the process being monitored. For example, the importance of any given alarm may be greater under one specific set of conditions and it would therefore be highly desirable to know when this alarm is activated under this specific set of conditions. Under another set of conditions the same alarm may be expected and might actually be the consequence of another alarm or of a process state. In these cases, the alarm should not be displayed at a very high level of importance since it is more of a status indicator than alarm condition.

Another methodology, which has not been widely accepted in industry, utilizes time-ordered sequences to determine the importance of alarms and to perform other diagnostic functions. In this approach, all possible (or likely) alarm activation sequences are identified and modeled. As a given scenario in the process being monitored develops, the alarm sequence is matched to the modeled sequences in attempting to identify what the current and future state of the process is or is likely to be. This approach is generally presented in the form of logic, or cause-consequence, trees. Unfortunately, these logic trees are difficult and expensive to develop and build, are generally inflexible to change, and are not easily maintained over the life of a plant. As a result, the logic tree approach to alarm analysis has been of limited use in real applications. Examples of the logic tree approach, particularly as applied to the environment of a nuclear power reactor, are: DMA (Diagnosis of Multiple Alarms), disclosed in an article by M. M. Danchak, entitled "Alarms within Advanced Display Streams: Alternatives and Performance Measures", published in NUREG/CR-2276, EGG-2202, September 1982; and STAR, disclosed in an article by L. Felkel, entitled "The STAR Concept, Systems to Assist the Operator During Abnormal Events," published in *Atomkernegie, Kertechnik*, Vol. 45, No. 4, 1984, pp. 252-262; and DASS (Disturbance Analysis and Surveillance Systems), disclosed in an article by A. B. Long, R. M. Kanazava et al, entitled "Summary and Evaluation of Scoping and Feasibility Studies for Disturbance Analysis and Surveillance Systems (DASS)", published in Topical Report EPRI NP-1684, December 1980.

The present invention is intended to overcome the aforementioned limitations of the prior art by providing an alarm filtering or analysis methodology based upon the functional relationships of alarms which is not only sensitive to the dynamic nature of the process being monitored, but also is capable of changing alarm importances as necessary. The present invention utilizes artificial intelligence techniques and knowledge-based heuristics to analyze alarm data from process instrumentation and respond to that data according to knowledge encapsulated in objects and rules.

OBJECTS AND SUMMARY OF THE INVENTION

Accordingly, it is an object of the present invention to provide improved analysis of process control alarms in an operating system.

It is another object of the present invention to provide for the analysis of alarms in a process based upon functional relationships among alarms rather than in terms of a cause-consequence relationship.

Yet another object of the present invention is to provide an alarm signal filtering methodology based upon the relationships that a newly activated alarm has with other currently activated alarms.

A further object of the present invention is to provide an alarm analysis system and method based initially upon the relationships which the newly activated alarm has with other currently activated alarms followed by analysis of that alarm with respect to each subsequently activated alarm.

A still further object of the present invention is to provide a functional relationship-based alarm filtering methodology which is responsive to the dynamic nature of the process being monitored and can change alarm importances as necessary.

Another object of the present invention is to provide artificial intelligence techniques, including object-oriented programming, in the analysis of alarms and alarm sequences in an operating system or process.

The present invention employs artificial intelligence techniques and knowledge-based heuristics to analyze alarm data from process instrumentation and respond to that data according to knowledge encapsulated in objects and rules. The system and method of the present invention filters alarm data, and the most important alarms and information are emphasized to operators during major transients. Alarms not applicable to current process modes are eliminated, while standing alarms resulting from maintenance or unusual operating conditions are inhibited and de-emphasized. Using functional relationships in hierarchical rulesets, the present invention:

Generates a description of a situation implied by combinations or sequences of alarms;

Suppresses display of information that confirms or is a direct consequence of a previously described situation; and Emphasizes alarms that do not fit previous conclusions or alarms that are expected (due to previous alarms or conditions) but are not received within specified time limits. These expected alarms are typically the result of automatic system response to a process state or operator action.

The analysis performed in carrying out the present invention is based on an understanding of functional relationships between alarms and states. Functional relationships are defined in terms of level precursors, direct precursors, required actions and blocking actions. Each type of relationship has a set of possible responses and decisions that can be made. This decision making knowledge is embodied in rules that are generic (in the sense that they do not address specific alarms or process states). These rules (and their knowledge content) remain unchanged during the development of a specific alarm processing approach regardless of the process with which the present invention is used. For example, the rules in alarm processing for a nuclear power plant would be identical to the alarm processing rules for a chemical processing plant.

The portions of the inventive alarm processing approach that are unique to the process being monitored are the objects representing the alarms and possible process states. Each object contains data about the specific entity that it represents. This separation of knowledge makes the present invention very versatile since alarms (or states) can be changed or added and not affect the structure of the decision-making mechanism; only the knowledge that the mechanism uses is affected.

Procedural, object-oriented and access-oriented, and rule-based programming paradigms are utilized in the present invention. The integration of these paradigms provides the present invention with a high degree of modularity and adaptability. Rules allow the capture and maintenance of heuristic knowledge about alarm relationships, while the object- and access-oriented programming allows each alarm's representation to act as an independent entity. An object can perform processing on its own, create new processes to analyze other portions of the system, or cause delayed processing to occur based on a temporal or event basis.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 10A and 10B illustrate an alarm display for use with the alarm processing system and method of the present invention as employed in a nuclear power test reactor.

DESCRIPTION OF PREFERRED EMBODIMENT

Figure 1:
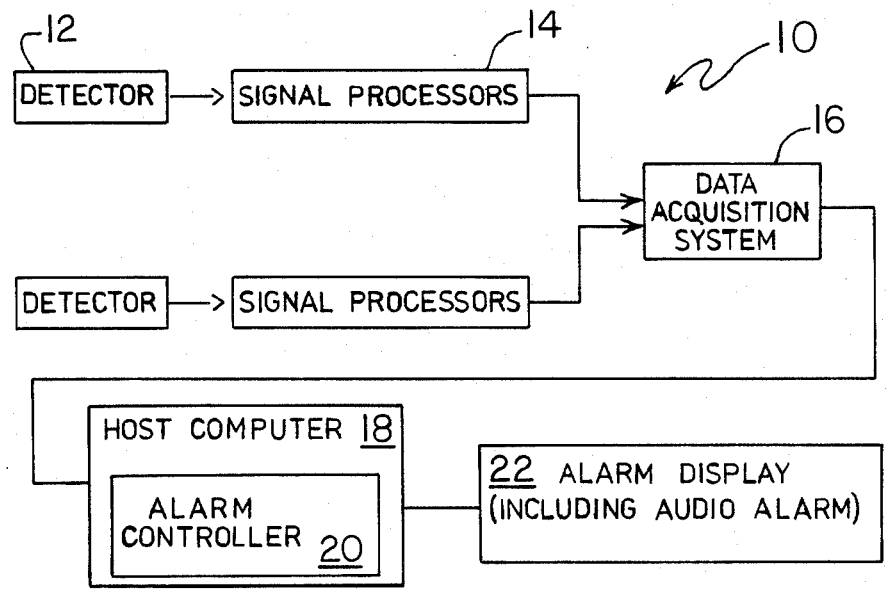
FIG. 1 is a simplified block diagram of a process monitoring system with which the functional relationship-based alarm processing system and method of the present invention is intended for use.

Referring to FIG. 1, there is shown a simplified block diagram of a process monitoring system 10 in which the functional relationship-based alarm processing system and method of the present invention is intended for use.

The process monitoring system 10 includes a plurality of detectors 12 for sensing various operating parameters of a process. Signals representing these operating parameters are provided from the various detectors 12 to a plurality of signal processors 14 for analysis of this operating data. The signal processors 14 analyze and process this operating data and provide this data to a data acquisition system 16 within the process monitoring system 10. Processing of the operating data within the various signal processors 14 may include the comparison of detector outputs to preset operating parameter limits, comparison of current with previously detected and stored operating parameter values, predictions of future operating parameter values, etc. This operating data is then provided from the data acquisition system 16 to a host computer 18 which includes an alarm controller 20 programmed to carry out functional relationship-based alarm processing in accordance with the present invention. The alarm controller 20 in a preferred embodiment is a microprocessor which forms a portion of the host computer 18. Output signals are provided by the host computer 18 in accordance with the manner in which the alarms are processed in the present invention to an alarm display 22 for providing a visual or aural indication to an operator monitoring the status of the process or operating system. An example of a visual alarm display used in one embodiment of the present invention is described below.

The present invention contemplates analysis of each alarm as it is activated and determines its relative importance with other currently activated alarms and signals in order to determine that alarm's importance relative to the current state of the process as that state can be determined from available instrumentation. The method for determining the relative importance is based upon the relationships that the newly activated alarm has with other currently activated alarms. Once the initial level of importance has been determined, that alarm will again be evaluated if another related alarm is activated. Thus, each alarm's importance is continuously updated as the state of the process changes during a scenario.

Figure 2:
FIGS. 2-9 illustrate in simplified block diagram form the functional relationships among various alarms defined in accordance with the alarm processing carried out by the present invention.
Figure 3:
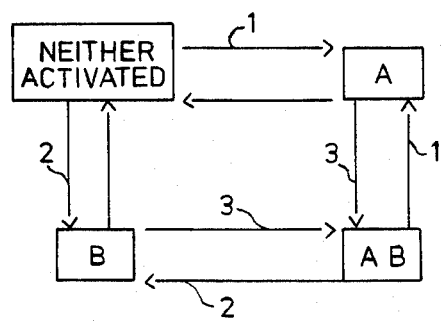

The first relationship among alarms used in the present invention is Level Precursor as shown in FIG. 2, which usually occurs when there are two alarm setpoints on a single paramater. If alarm A is a level precursor of alarm B, then A should occur before B. Thus, alarm A might be activated at 10 psi, while alarm B might be activated at 20 psi. Alarm A would therefore be a Level Precursor to Alarm B, meaning that if both A and B are activated, A will be de-emphasized relative to B. The various rules applicable to Level Precursors are as follows, with these rules illustrated by their associated numbers in simplified block diagram form in FIG. 3:

Rule 1:
If only A is activated, then A will be displayed as primary.

Rule 2:
If only B is activated, then B will be displayed as primary, with a message provided to the alarm display indicating that A is expected prior to B.

Rule 3:
If both A and B are activated, then A will be secondary and B will be primary.

Figure 4:
Figure 5:
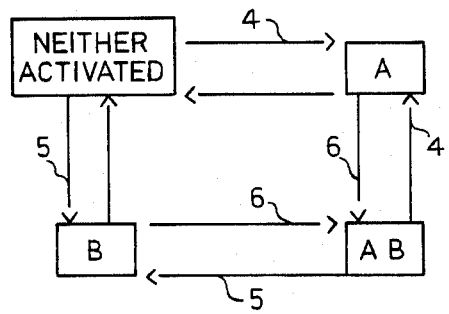

The next relationship between alarms used in the present invention is Direct Precursor which is based on causal factors between the two alarms as shown in FIG. 4. Given that alarm A is Direct Precursor of alarm B, then not-only should A occur before B, but A's occurrence can cause B's occurrence. Thus, if alarm A is a possible cause for the activation of alarm B, then if both alarms are activated, alarm B will be de-emphasized relative to alarm A. Defining these relationships between alarms A and B is set forth in the following rules 4, 5 and 6 and is illustrated in simplified block diagram from in FIG. 5 where the numbers indicated therein represent a respective one of the following rules:

Rule 4:
If only A is activated, then A will be displayed as primary.

Rule 5:
If only B is activated, then B will be displayed as primary.

Rule 6:
If both A and B are activated, then A will be primary and B will be secondary.

Figure 6:
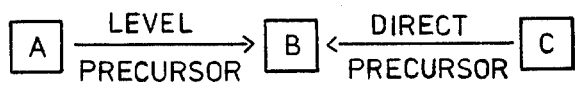

Even when an alarm is emphasized by one relationship, it may be de-emphasized by another. This de-emphasis takes precedence until the reason for the de-emphasis disappears. Take for example the case where alarm A is Level Precursor to alarm B and alarm C is a Direct Precursor to alarm B as illustrated in FIG. 6. This situation is guided by the following two rules:

Rule 6a:
If A and B are activated and C is not activated, then B is primary and A is secondary.

Rule 6b:
If A, B and C are all activated, then C is primary and A and B are secondary.

Figure 7:
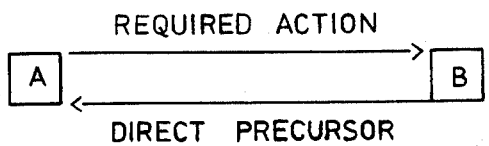

The third alarm relationship defined in the present invention is High Priority Required Actions. This relationship generally occurs when there is some automatic system response or procedural requirement for operator response to a specific plant or process event or state. Thus, if alarm A is a required action of alarm B, then when B occurs, A had better follow. Examples of this alarm relationship would be a scram, or automatic shutdown, alarm based on 2:3 logic on a shutdown parameter; a valve operation following the closing or opening of a handswitch operator for the valve; or a procedural requirement for an operator to shut a valve following a loss of vacuum in a condenser. Since in this relationship alarm A is a high priority required action of alarm B, then by definition B is a Direct Precursor of A. Thus, the display of A and B when they are activated (together or individually) is illustrated in FIG. 7 and is described above in terms of the Direct Precursor alarm relationship. The High Priority Required Actions relationship is generally time dependent and is typically concerned with the situation where alarm B is activated and alarm A does not occur within a specified time interval. This alarm relationship must also take into consideration the proper response when either alarm A or alarm B clears.

Figure 8:
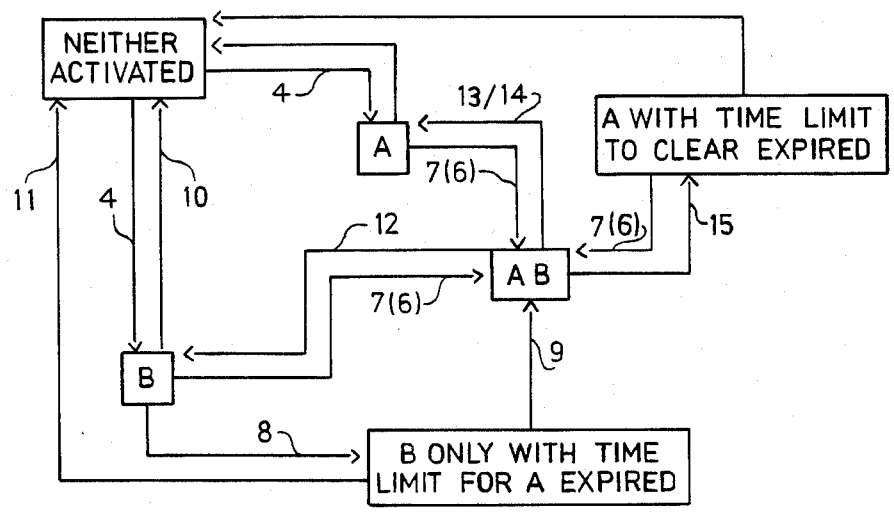

Processing of alarms in accordance with the present invention includes the assumption that if alarm B is activated, then alarm A should be activated. In other words, alarm processing in the present invention waits for the same period of time as when alarm B was initially activated. At the end of this time interval, if alarm B is still activated and alarm A is not, then alarm A will be considered as missing. If alarm B clears before alarm A clears, then one of several responses may be warranted, all of which can be implemented in the present invention. It may be that once alarm B has cleared, alarm A should be immediately re-evaluated to determine its importance relative to the current set of activated alarms. In other situations it may be appropriate to wait for a specified amount of time prior to re-evaluating alarm A's importance. Finally, it may be that alarm A should be left as secondary for the remainder of the time period that it is activated. The rules applying to the High Priority Required Actions alarm relationship between alarms A and B are graphically summarized in FIG. 8 and are listed as follows:

Rule 7:
If B is activated and A is activated within the time limit, then display A and B as in Rule 6.

Rule 8:
If B is activated and A is not activated within the time limit, then send message to alarm display stating that A was expected within X seconds of B. A is emphasized to highest level possible.

Rule 9:
If B is activated and A is not activated within time limit and A is then activated, then A's display reverts to Rule 6.

Rule 10:
If B is activated and B is then cleared prior to time limit for A, then no action is taken.

Rule 11:
If B is activated and A is not activated within time limit and B is then cleared, then A's display is cleared.

Rule 12:
If A and B are activated and A then clears, then situation is treated as if B has just been activated and response is in accordance with Rules 7-11.

Rule 13:
If A and B are activated and B is cleared and there is no time limit for A to clear, then A remains secondary.

Rule 14:
If A and B are activated and B is cleared and time limit has not expired for A to clear, then A remains secondary.

Rule 15:
If A and B are activated and time limit for A to clear expires, then A is re-evaluated according to the current set of activated alarms.

Figure 9:
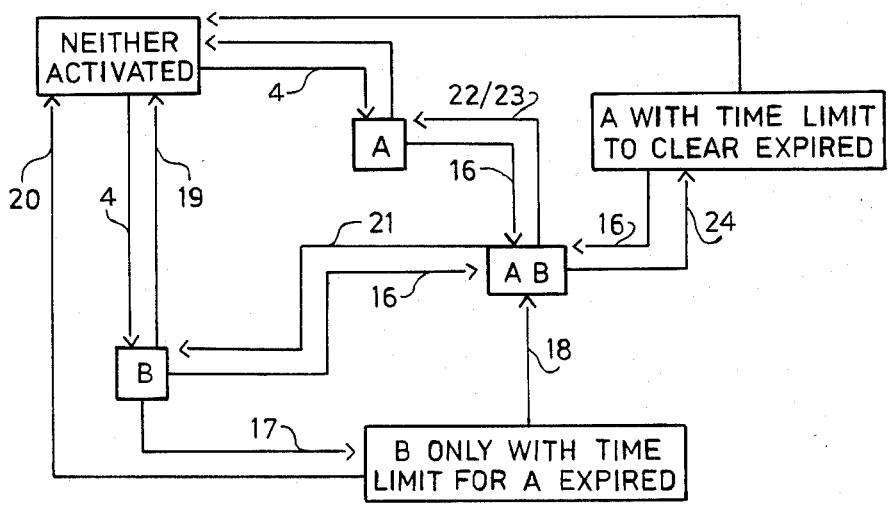

Another alarm relationship used in the present invention is termed Low Priority Required Actions and is very similar to the high priority required actions relationship except that the level of emphasis concerning the missing action is not as high. In fact, a major indication provided to an operator or one monitoring the process is simply a visual message typically provided by a printer. Thus, this alarm relationship is also illustrated by FIG. 7, where alarm A is a low priority required action of alarm B. Since alarm A is a required action of alarm B, then by definition alarm B is a Direct Precursor of alarm A. Thus, the display of alarms A and B when they are activated, either together or individually, is as set forth above in the explanation of the Direct Precursor alarm relationship. The Low Priority required actions time-dependent relationship is mainly concerned with the situation where alarm B is activated and alarm A does not occur within a specified time interval. The question which must be answered in this alarm relationship is how to properly respond when either alarm clears. The present invention addresses this situation for low priority required actions in the same way as higher priority required actions as outlined in the following Rules 16–24 and as illustrated in the block diagram of FIG. 9.

Rule 16:
If B is activated and A is activated within the time limit, then display A and B as in Rule 6.

Rule 17:
If B is activated and A is not activated within the time limit, then send message to alarm display that A was expected within X seconds of B.

Rule 18:
If B is activated and A is not activated within the time limit and A is then activated, then A's display reverts to Rule 6.

Rule 19:
If B is activated and B is then cleared prior to time limit for A, then no action is taken.

Rule 20:
If B is activated and A is not activated within the time limit and B is then cleared, then no effect on A's display.

Rule 21:
If A and B are activated and A then clears, then this situation is considered as B just having been activated and response is in accordance with Rules 16-20.

Rule 22:
If A and B are activated and B is cleared and there is no time limit for A to clear, then A remains secondary.

Rule 23:
If A and B are activated and B is cleared and time limit has not expired for A to clear, then A remains secondary.

Rule 24:
If A and B are activated and time limit for A to clear expires, then A is re-evaluated according to the current set of activated alarms.

The final alarm relationship utilized in the present invention is a Blocking Condition which is designed to affect the display of an alarm. The manner in which the display is affected depends upon the process with which the alarm processing approach of the present invention is used. The Blocking Condition is generally used to de-emphasize the display of an alarm (sometimes to the point of not displaying the alarm at all) based upon some process condition, although the alarm still appears activated. For example, where alarm A is a blocking condition for alarm B and with alarms A and B both activated, the display of alarm B will remain unchanged and no processing of alarm B's relationships will occur until alarm A clears. The rules implemented in carrying out the Blocking Condition are set forth as follows:

Rule 25:
If only A is activated, then A will be processed and displayed according to its relationships to other activated alarms.

Rule 26:
If only B is activated, then B will be processed and displayed according to its relationships to other activated alarms.

Rule 27:
If both A and B are activated, then B's display will be blocked and A's display will remain the same as in Rule 25.

In the following paragraphs implementation of the functional relationship-based alarm processing approach of the present invention in the Advanced Test Reactor (ATR) at the Idaho National Engineering Laboratory is described in detail. Referring to FIGS. 10A and 10B there is shown an alarm display 22 used in a preferred embodiment of the present invention when employed with the ATR. The alarm display 22 includes a plurality of alarm tiles in a rectangular matrix array together with first and second text windows 26, 28. The first text window 26 labeled "Plant Status Printer" represents a printer having an output which would typically be reviewed by an operator after the fact to analyze what happened and check for proper system response. The second text window 28 labeled "Plant Alarm Messages" represents the output to a plant operator that would be immediately available at the time of a transient. The second text window 28 thus would typically be in the form of a console centrally located in the control display system of the ATR.

When an alarm is identified as a primary cause, its tile is inverted, while an alarm identified as a precursor to or a consequence of a primary cause has its tile turned gray with black lettering. The primary causal level is further emphasized because it is the only level that must be acknowledged since an audio alarm continues until the primary alarm is acknowledged. The configuration of the alarm display 22 illustrated in FIGS. 10A and 10B corresponds to its appearance following a low pressure scram sequence in the ATR. The primary alarm (Inlet Pressure High-High) is the cause of the scram sequence as emphasized by the color of alarm tile 24 as well as by an audio alarm. The secondary alarms which are suppressed in gray in the figure (stippled alarm tiles) are either precursors (Inlet Pressure High-Low) or direct consequences (Scram) of the Inlet Pressure High-High trip. The remaining display levels deal with expected alarms and utilize both the tile display as well as the first and second text windows 26 and 28.

Once an initiating event has occurred, automatic system response becomes of paramount importance in many alarm sequences. If an automatic function does fail, an operator must recognize that failure and take some action to return the plant to a safe condition. The present invention thus defines a set of plant states and expected responses to those states. When one of these responses fails to occur, the present invention causes flashing of the associated alarm on the alarm display 22 and sends a brief explanatory note to the Plant Alarm Messages window 28. The flashing of the expected alarm on the alarm display 22 continues until the arrival of the alarm signal from the plant. This ensures the visual emphasis of the information which demands action on the part of the operator. In the example illustrated in FIGS. 10A and 10B if a scram did not occur after all the conditions had been met for a scram, the SCRAM tile 26 would have started flashing and a message would have been sent to the operator explaining what was required and why.

In some cases, a missing alarm is not particularly important to the operator at the time of a transient. For example, in the ATR all four division logics should trip when a scram condition occurs. If one fails to trip, the scram would still take place and the operator would probably not care to see a message concerning the failed division logic while trying to recover the plant from the transient. In this case, the operating system would leave the associated alarm tile in a normal state and would send a message to the "Plant Status Printer" 26 stating that the logic trip had failed to occur as expected.

The least stringent of the functional relationships is that of the level precursors. In the following discussion which provides an example of the use of the present invention in ATR, the letters X, Y and Z refer to either an alarm or a state. If X is a level precursor of Y, then X should occur before Y. However, X's occurrence does not imply the occurrence of Y. For example, the high pressure alarm (InPressHiHiA-vessel inlet pressure high at 250 psi) should occur prior to the high-high pressure trip (InPressHiHiTrip-vessel inlet pressure high-high at 280 psi). However, the occurrence of the high pressure alarm does not always mean the high-high pressure trip will occur since the pressure could stabilize below 280 psi.

Direct precursors are similar to level precursors but have one important difference. Given that Y is a direct precursor of Z, then not only should Y occur before Z, but Y's occurrence can cause Z's occurrence. Thus, if Z occurs and Y has already occurred (or occurs in the future), Z will know that it is a consequence of Y. This direct implication is very important in determining primary causal alarms. If all three alarms have occurred, it will be determined that X is not a primary causal alarm because it is a level precursor of Y. In turn, Z is not a primary causal alarm because it has a valid direct precursor (Y), which implies that Z is the result of Y. Hence, Y is determined by the primary causal alarm. In general, missing level or direct precursors are treated with a low priority by sending a message to the plant status printer 26. In the case of required actions, if Y is a required action of X, then when X occurs Y had better follow. An example of this in the ATR can be illustrated with the DLTsTripped and SCRAM alarms. The DLTsTripped state (2:4 sets of division logics are tripped) and the SCRAM (indicating a scram has occurred) alarm serve as examples of both a direct precursor and a required action. DLTsTripped is a direct precursor to a SCRAM. Thus, if a scram occurs, the present invention will be looking to see if DLTsTripped is true. From the opposing point of view, SCRAM is a required action of DLTsTripped. Thus, when two division logics are recognized as being tripped, the present invention will be looking for the SCRAM alarm. If a required action does not take place, an operator is notified at the highest priority by flashing the appropriate alarm tile on the alarm display 22 and sending a message to the plant alarm messages window 28.

Figure 11:
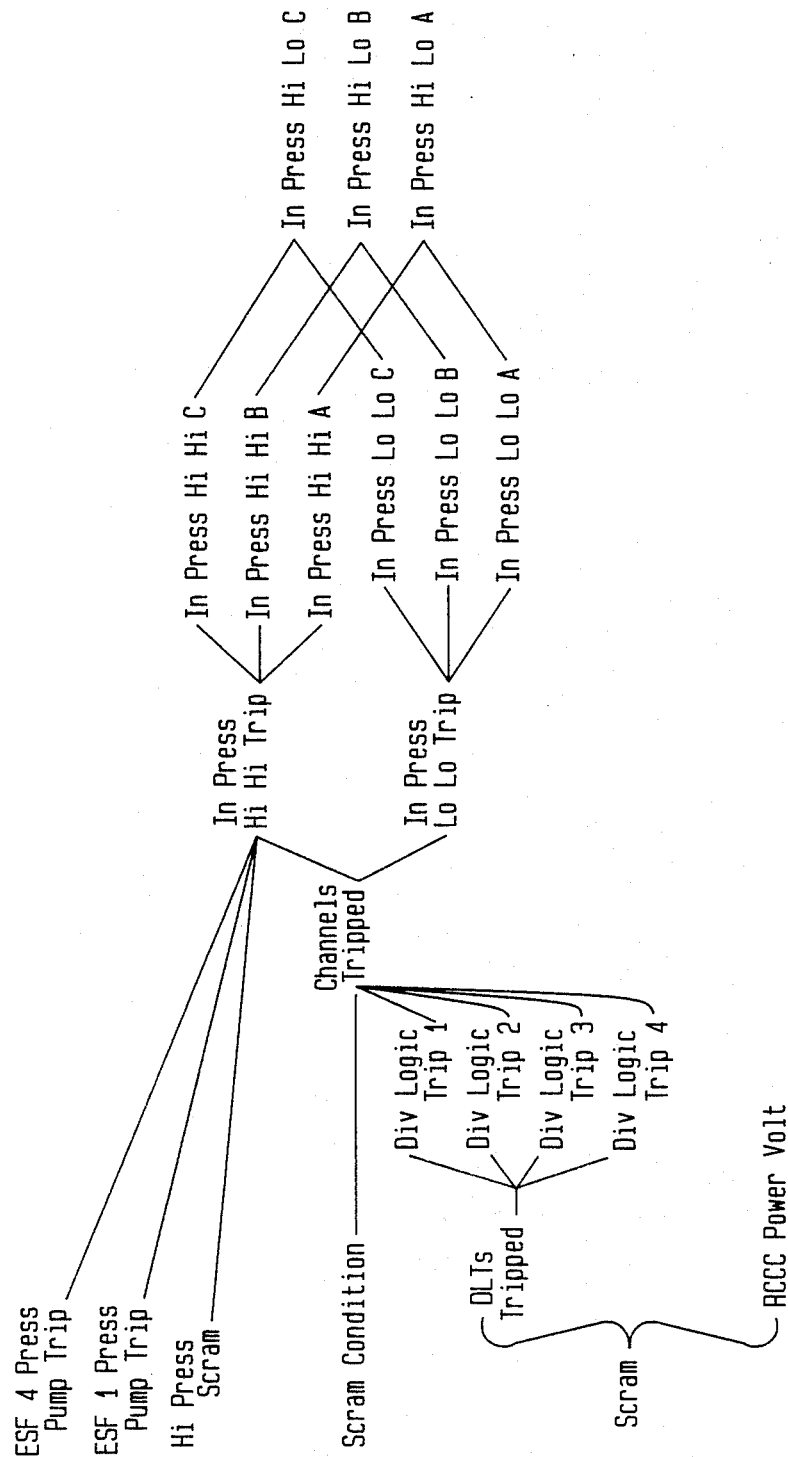
FIG. 11 illustrates the precursor relationships of some of the 200 alarms and states used in the functional relationship-based alarm processing system and method of the present invention as utilized in a nuclear power test reactor.

FIG. 11 illustrates the precursor relationships of some of the 200 alarms and states used by the present invention in ATR. Each link in the graph represents either a level or a direct precursor. For example, the link between SCRAMP and DLTsTripped represents the direct precursor relationship discussed above.

There has thus been shown a functional relationship-based alarm processing approach which initially evaluates each alarm in terms of its relative importance by comparing it with currently activated alarms. Once the initial level of importance of an alarm has been determined, that alarm will again be evaluated if another related alarm is activated. Thus, each alarm's importance is kept updated as the state of the process changes during the scenerio. The present invention makes use of four basic relationships between alarms and either displays or does not display an activated alarm based upon which alarms have been previously activated and the relationships which the present alarm has with the previously activated alarms. Although described herein for use in a nuclear power plant, the generic nature of the underlying technology of the present invention allows it to be easily adapted to other processes. For example, the present invention is currently being installed in the Fluorine Dissolution and Fuel Storage Facility (FAST) at the Idaho National Engineering Laboratory in Idaho Falls, Id. By integrating rule-oriented programming into an object-oriented environment, exhaustive searches of extensive databases or structures is avoided in the high speed processing of large numbers of process alarms. Since the only rules checked (and the only objects referenced) are those directly related to the event being processed, the computational requirements per event encountered in carrying out the present invention are not dependent upon the alarm space size, but rather upon the relational complexity of those alarms. The use of an object-oriented alarm model ensures a high degree of flexibility for the present invention which is easily adapted to subsequent modifications of the process with which it is integrated.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. In the monitoring of a process, a method for classifying a plurality of process alarms A and B each representing a respective operating state of said process as of primary importance or of secondary importance based upon functional relationships among said alarms, said method comprising the steps of:
   defining each of the alarms A and B in terms of one of the following relationship categories:
   alarm A is a level precursor of alarm B such that alarm A should occur before alarm B;
   alarm A is a direct precursor of alarm B such that alarm A should occur before alarm B and alarm A's occurrence can cause alarm B's occurrence;
   alarm A is a priority required action of alarm B such that occurrence of alarm B should cause the activation of alarm A; or
   alarm A is a blocking condition for alarm B such that, with both alarms A and B activated, alarm B will not be processed until alarm A is no longer activated, or clears; and
   assigning primary importance to an activated alarm and secondary importance to that alarm which is not activated when one of the alarms is activated and the other alarm is not activated, and, where both alarm A and alarm B are activated, assigning primary importance to alarm B and secondary importance to alarm A where alarm A is a level precursor of alarm B or assigning primary importance to alarm A and secondary importance to alarm B for the remaining relationship categories between alarms A and B.

2. The method of claim 1 further comprising the step of displaying the alarm designated as being of primary importance.

3. The method of claim 1 further comprising the steps of displaying the alarm designated as being of primary importance in a first display mode and displaying the alarm designated as being of secondary importance in a second display mode, where said first display mode is more pronounced than said second display mode.

4. The method of claim 1 where alarm A is a level precursor of alarm B and wherein only alarm B is activated, further comprising the step of providing an indication that alarm A is expected prior to alarm B.

5. The method of claim 1 wherein alarm A is a level precursor of alarm B and an alarm C is a direct precursor to alarm B, wherein alarms A and B are activated and alarm C is not activated, further comprising the step of assigning primary importance to alarm B and secondary importance to alarm A.

6. The method of claim 1 where alarm A is a level precursor of alarm B and an alarm C is a direct precursor to alarm B, wherein alarms A, B and C are activated, further comprising the step of assigning primary importance to alarm C and secondary importance to alarms A and B.

7. The method of claim 1 where alarm A is a priority required action of alarm B such that activation of alarm B is expected within a predetermined time interval of the activation of alarm A, wherein alarm B is activated and alarm A is activated within said predetermined time interval, further comprising the step of assigning primary importance to alarm A and secondary importance to alarm B.

8. The method of claim 1 where alarm A is a priority required action of alarm B such that activation of alarm B is expected within a designated time interval of the activation of alarm A, wherein alarm B is activated and alarm A is not activated within said predetermined time interval, further comprising the step of assigning primary importance to alarm A.

9. The method of claim 8 further comprising the step of providing an indication that alarm A was expected within said predetermined time interval of the activation of alarm B.

10. The method of claim 9 further comprising the step of assigning a highest level of importance to alarm A.

11. The method of claim 1 where alarm A is a priority required action of alarm B such that activation of alarm B is expected within a designated time interval of the activation of alarm A, wherein alarm B is activated and alarm A is activated after said predetermined time interval, further comprising the step of assigning primary importance to alarm A and secondary importance to alarm B.

12. The method of claim 1 where alarm A is a priority required action of alarm B such that activation of alarm B is expected within a designated time interval of the activation of alarm A, wherein alarm A is inactive and alarm B is activated followed by de-activation of alarm B during said designated time interval, further comprising the step of maintaining alarms A and B with their respective current levels of importance.

13. The method of claim 1 where alarm A is a priority required action of alarm B such that activation of alarm B is expected within a designated time interval of the activation of alarm A, wherein alarm B is activated and alarm A is not activated within said designated time interval followed by de-activation of alarm B, further comprising the step of assigning secondary importance to alarm A.

14. The method of claim 1 wherein alarm A is a priority required action of alarm B such that activation of alarm B is expected within a designated time interval of the activation of alarm A, wherein alarms A and B are activated followed by de-activation of alarm A and re-activation of alarm A within said designated time interval, further comprising the step of assigning primary importance to alarm A and secondary importance to alarm B.

15. The method of claim 1 where alarm A is a priority required action of alarm B such that activation of alarm B is expected within a designated time interval of the activation of alarm A, wherein alarms A and B are activated followed by de-activation of alarm A and wherein alarm A is not re-activated within said designated time interval, further comprising the step of assigning primary importance to alarm A.

16. The method of claim 15 further comprising the step of providing an indication that alarm A was expected within said predetermined time interval of the activation of alarm B.

17. The method of claim 16 further comprising the step of assigning a highest level of importance to alarm A.

18. The method of claim 1 where alarm A is a priority required action of alarm B such that activation of alarm B is expected within a designated time interval of the activation of alarm A, wherein alarm B is activated and alarm A is activated after said predetermined time interval, further comprising the step of assigning primary importance to alarm A and secondary importance to alarm B.

19. The method of claim 1 where alarm A is a priority required action of alarm B such that activation of alarm B is expected within a designated time interval of the activation of alarm A, wherein alarms A and B are activated followed by de-activation of alarm B and failure of alarm A to de-activate within said predetermined time interval, further comprising the step of assigning secondary importance to alarm A.

20. The method of claim 1 where alarm A is a priority required action of alarm B such that activation of alarm B is expected within a designated time interval of the activation of alarm A, wherein alarms A and B are activated followed by de-activation of alarm B and de-activation of alarm A within said predetermined time interval, further comprising the step of assigning secondary importance to alarm A.

21. The method of claim 1 where alarm A is a blocking condition for alarm B and wherein alarm A is activated and alarm B is not activated, further comprising the step of assigning a level of importance to alarm A in accordance with its relationship categories to other activated alarms.

22. The method of claim 1 further comprising the step of displaying alarm A.

23. The method of claim 1 where alarm A is a blocking condition for alarm B and wherein alarm B is activated and alarm A is not activated, further comprising the step of assigning a level of importance to alarm B in accordance with its relationship categories to other activated alarms.

24. The method of claim 1 where alarm A is a blocking condition for alarm B and wherein alarms A and B are both activated, further comprising the steps of assigning secondary importance to alarm B and allowing the priority of alarm A to remain unchanged.

25. The method of claim 24 further comprising the steps of preventing a display of alarm B and allowing a display of alarm A to remain unchanged.

* * * * *